(12) United States Patent
Brück et al.

(10) Patent No.: US 10,393,102 B2
(45) Date of Patent: Aug. 27, 2019

(54) PUMP FOR PUMPING A LIQUID ALONG AT LEAST ONE DELIVERY PATH DELIMITED BY A DEFORMABLE ELEMENT BRACED IN AN AXIAL DIRECTION BY A STRESS ANCHOR PROJECTING THROUGH A PUMP ROTATION SHAFT

(71) Applicant: CONTINENTAL AUTOMOTIVE GMBH, Hannover (DE)

(72) Inventors: Rolf Brück, Bergisch Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 437 days.

(21) Appl. No.: 14/898,055

(22) PCT Filed: May 19, 2014

(86) PCT No.: PCT/EP2014/060234
§ 371 (c)(1),
(2) Date: Dec. 11, 2015

(87) PCT Pub. No.: WO2014/198498
PCT Pub. Date: Dec. 18, 2014

(65) Prior Publication Data
US 2016/0146078 A1    May 26, 2016

(30) Foreign Application Priority Data
Jun. 13, 2013   (DE) .................. 10 2013 106 167

(51) Int. Cl.
*F01N 3/20*    (2006.01)
*F04C 5/00*    (2006.01)
(Continued)

(52) U.S. Cl.
CPC ............ *F04B 43/123* (2013.01); *F01N 3/206* (2013.01); *F01N 3/2066* (2013.01);
(Continued)

(58) Field of Classification Search
CPC ...... F01C 5/00; F01C 5/04; F01C 5/08; F04B 43/00; F04B 43/0072; F04B 43/12;
(Continued)

(56) References Cited

U.S. PATENT DOCUMENTS

| 1,765,360 A | 6/1930 | Baumann |
| 3,335,670 A | 8/1967 | Williams |

(Continued)

FOREIGN PATENT DOCUMENTS

| CN | 86200414 | 11/1986 |
| CN | 87101956 | 9/1988 |

(Continued)

OTHER PUBLICATIONS

Office Action dated Apr. 20, 2017 which issued in the corresponding Korean Patent Application No. 10-2016-7000822.
Office Action dated Nov. 2, 2016 which issued in the corresponding Chinese Patent Application No. 201480044383.0.

*Primary Examiner* — Alexander B Comley
*Assistant Examiner* — Benjamin Doyle
(74) *Attorney, Agent, or Firm* — Cozen O'Connor (57) ABSTRACT

A pump for pumping a liquid has a pump housing with at least one inlet and at least one outlet. The pump housing has an eccentric rotatable relative to the pump housing by an axle. A deformable element is arranged between the pump housing and the eccentric, and by the deformable element, at least one pump path from the at least one inlet to the at least one outlet is delimited and at least one movable pump path seal is formed, which separates at least one closed pump volume in the pump path. The at least one movable seal is movable in a pump direction from the inlet to the outlet by (Continued)

a movement of the eccentric to pump the fluid along the pump path. The pump has at least one adjustable axial calibrating device, by which the deformable element is clamped in the axial direction parallel to the axle.

11 Claims, 5 Drawing Sheets

(51) Int. Cl.
  *F04B 43/00* (2006.01)
  *F04B 43/12* (2006.01)
  *F04B 43/14* (2006.01)
  *F04C 15/00* (2006.01)
(52) U.S. Cl.
  CPC ...... *F04B 43/0054* (2013.01); *F04B 43/0081* (2013.01); *F04B 43/12* (2013.01); *F04B 43/14* (2013.01); *F04C 5/00* (2013.01); *F01N 2610/02* (2013.01); *F01N 2610/144* (2013.01); *F01N 2610/1433* (2013.01); *F04C 15/0015* (2013.01); *F04C 15/0065* (2013.01); *Y02A 50/2325* (2018.01); *Y02T 10/24* (2013.01)
(58) Field of Classification Search
  CPC ................ F04B 43/1207; F04B 43/123; F04B 43/1253; F04B 43/14; F04B 43/0054; F04B 43/0081; F04B 9/042–045; F04B 17/03; F04B 35/01–04; F04B 39/14; F04B 43/0027–0036; F04B 43/09; F04B 43/1238; F04B 45/067; F04B 45/08–085; F04B 53/16; F04B 53/22; F04C 5/00; F01N 3/206; F01N 3/2066; F01N 2610/02; F01N 2610/1433; F01N 2610/144; Y02T 10/24
  See application file for complete search history.

(56) References Cited

U.S. PATENT DOCUMENTS

| | | | |
|---|---|---|---|
| 3,549,279 | A | 12/1970 | Grach |
| 4,500,269 | A | 2/1985 | Jess |
| 2002/0001530 | A1 | 1/2002 | Doi et al. |
| 2005/0235732 | A1* | 10/2005 | Rush ................. A61M 5/14216 73/1.16 |
| 2006/0278001 | A1* | 12/2006 | Kaneko ............... A61M 1/3639 73/706 |
| 2012/0285147 | A1 | 11/2012 | Hodgson et al. |
| 2014/0017094 | A1* | 1/2014 | Ghodsi-Kameneh ........................ F01C 21/08 417/44.1 |

FOREIGN PATENT DOCUMENTS

| | | | |
|---|---|---|---|
| CN | 101275554 | | 10/2008 |
| DE | 29 45 042 | | 5/1981 |
| DE | 10 2007 059 240 | | 6/2009 |
| DE | 102011015110 | | 1/2012 |
| EP | 0052679 | A1 | 6/1982 |
| FR | 1 394 047 | A | 4/1965 |
| GB | 768 253 | A | 2/1957 |
| GB | 768253 | A * | 2/1957 ............. F04B 43/14 |
| JP | S 55-84891 | | 6/1980 |
| JP | S 60-119395 | | 6/1985 |
| JP | H 01-315687 | | 12/1989 |
| JP | H 02-145681 | U | 12/1990 |
| JP | H 02-301684 | | 12/1990 |
| JP | H 05-505863 | | 8/1993 |
| JP | H 08-28453 | | 1/1996 |
| JP | 2004-124875 | | 4/2004 |
| JP | 2005-054709 | | 3/2005 |
| JP | 2013-513056 | | 4/2013 |
| WO | WO 92/09805 | A1 | 6/1992 |
| WO | WO2014198498 | | 12/2014 |

* cited by examiner

PUMP FOR PUMPING A LIQUID ALONG AT LEAST ONE DELIVERY PATH DELIMITED BY A DEFORMABLE ELEMENT BRACED IN AN AXIAL DIRECTION BY A STRESS ANCHOR PROJECTING THROUGH A PUMP ROTATION SHAFT

CROSS-REFERENCE TO RELATED APPLICATIONS

This is a U.S. national stage of application No. PCT/EP2014/060234, filed on 19 May 2014, which claims priority to the German Application No. DE 10 2013 106 167.2 filed 13 Jun. 2013, the content of both incorporated herein by reference.

BACKGROUND OF THE INVENTION

1. Field of the Invention

The invention relates to a pump for delivering a liquid, which pump is in particular suitable for delivering a liquid additive into the exhaust line apparatus of an internal combustion engine.

2. Related Art

For the purification of the exhaust gases of internal combustion engines, exhaust-gas treatment devices are known into which a liquid additive is supplied for the purposes of purifying the exhaust gases. An exhaust-gas purification method implemented in such exhaust-gas treatment devices is the selective catalytic reduction (SCR) method in which nitrogen oxide compounds in the exhaust gas are reduced with the aid of a reducing agent. Ammonia in particular is used as reducing agent. Ammonia is often stored in the motor vehicle not directly but in the form of a liquid additive that constitutes a precursor solution of the reducing agent. The liquid additive may be converted to form reducing agent within the exhaust gas (in the exhaust-gas treatment device) or outside the exhaust gas in a reactor provided specifically for the purpose. For the SCR method, urea-water solution is used as liquid additive. A 32.5% urea-water solution is available under the trade name AdBlue®.

For the delivery of liquid additive out of a tank and for the dosed supply of the liquid additive to the exhaust line apparatus, at least one pump is provided. A pump of this type should be as inexpensive and reliable as possible. It is particularly advantageous if the pump can also perform a dosing (metering) function, that is to say delivers a pre-defined amount of the liquid additive very accurately. Furthermore, during the delivery, the least possible pressure fluctuations should be generated in the liquid additive, because these can adversely affect the spray pattern of a nozzle for atomizing the liquid additive in the exhaust-gas treatment device. A further requirement is that the pump should be as quiet as possible.

A further important aspect in the case of pumps for delivering liquid additives is that the liquid additives for exhaust-gas purification that are used can freeze at low temperatures. The urea-water solution mentioned above, for example, freezes at −11° C. In the automotive field, such low temperatures can arise for example during long standstill periods in winter, wherein the liquid additive expands as it freezes. The pump should accordingly also be constructed such that it is not damaged by freezing liquid additive.

SUMMARY OF THE INVENTION

Taking this as a starting point, it is an object of the present invention to solve or at least alleviate the technical problems highlighted in connection with the prior art. It is sought in particular to describe a particularly advantageous pump for delivering a liquid, which pump is suitable for use in the technical field of exhaust-gas purification.

The objects are achieved by a pump according to the features disclosed herein. The features specified individually may be combined with one another in any desired technologically meaningful way and may be supplemented by explanatory facts from the description, with further design variants of the invention being highlighted.

According to one aspect, the invention relates to a pump for the delivery of a liquid, having a pump housing with at least one inlet and at least one outlet. On the pump housing, there is arranged an eccentric that is rotatable, with an axis, relative to the pump housing. A deformable element is arranged between the pump housing and the eccentric, wherein the deformable element delimits at least one delivery path from the at least one inlet to the at least one outlet and forms at least one displaceable seal of the delivery path, which at least one displaceable seal separates off at least one closed pump volume in the delivery path. By a movement of the eccentric, the at least one displaceable seal can be displaced in a delivery direction from the inlet to the outlet for the purposes of delivering the liquid along the delivery path. It is also provided that the pump has at least one adjustable axial calibration device by which the deformable element is braced in an axial direction parallel to the axis.

A pump with the described construction can be referred to as an orbital pump. A gap exists between the pump housing and the eccentric, in which gap the deformable element is arranged. The delivery path is arranged within the gap, and the delivery path is delimited at least by the (single) deformable element, and possibly additionally by the pump housing and/or by the eccentric. The deformable element is preferably arranged in the gap between the eccentric and the pump housing such that, in the region of the at least one seal, the deformable element is pinched or compressed between the housing and the eccentric, such that, in the region of the seal, the gap is completely closed by the deformable element and/or the gap no longer has, there, a cross-sectional area that forms a delivery path (through which flow can pass freely). The gap or the delivery path is thereby closed in fluid-tight fashion in the region of the at least one seal. The gap or the delivery path is filled with the liquid during the operation of the pump.

Along the delivery path, the at least one closed seal divides the delivery path, such that at least one closed pump volume is formed. The expression "closed pump volume" refers in particular to a volume within the delivery path, which volume is closed off at least at one side along the delivery path by a seal. It is preferable if, during the operation of the pump, multiple closed pump volumes are displaced from the inlet to the outlet in order to deliver the liquid. Here, a closed pump volume is created (meaning closed off) in the vicinity of the inlet and is then eliminated (opened again) at the outlet. At the inlet, a closed pump volume is closed off by a seal (only) on one side (in a downstream direction), and is connected in an upstream direction to the inlet, such that the liquid can flow through the inlet into the closed pump volume. At the outlet, the closed pump volume is (still) closed off by a seal (only) on one side (this however being in an upstream direction), and the closed pump volume is connected in a downstream direction to the outlet, such that the liquid can flow through the outlet out of the closed pump volume. In between (on the path from the inlet to the outlet), there is a phase in which the closed pump volume is closed off by a seal at both sides.

The pump housing of the pump is preferably a ring or a cylindrical chamber in which the eccentric is arranged (centrally) at the inside. The pump housing may also be regarded as an (external) stator of the pump, whereas the eccentric can be referred to as an (internal) rotor. In a further embodiment of the pump, it is possible for the pump housing to form an internal stator surrounded by the eccentric. The eccentric then forms an external rotor. The inlet and the outlet are arranged on the pump housing and permit the inflow and outflow of the liquid into the pump housing and into the delivery path.

It is particularly preferable if the deformable element is a hose laid in an arc-shaped gap between the eccentric and the pump housing and connecting the inlet to the outlet.

The hose (which is in one piece and/or situated inside and/or fixed in the pump housing) is in this case connected, in preferably fluid-tight fashion, to the inlet and to the outlet, such that the liquid can enter and exit the delivery path in the hose only through the inlet and through the outlet. The seal is formed by the hose being compressed there by the eccentric and by the pump housing.

The pump is also advantageous if the deformable element is a deformable diaphragm, and the delivery path from the at least one inlet to the at least one outlet is at least partially delimited by the pump housing and by the deformable diaphragm.

In this design variant, the delivery path is formed between the deformable diaphragm (which is in one piece and/or situated inside and/or fixed in the pump housing) and the pump housing, and constitutes a gap between the pump housing and the deformable diaphragm. To form the seal, the deformable diaphragm is pressed against the pump housing by the eccentric, such that the deformable diaphragm bears against the pump housing and no gap remains between the deformable diaphragm and the pump housing. The deformable diaphragm is preferably, in sections, formed around the pump housing in a U-shape and adhesively bonded to and/or pressed against the pump housing.

In any case, the deformable element is preferably composed of a flexible rubber material, which exhibits high deformability. Deformable elements composed of elastomer materials, for example of natural rubber or of latex, are particularly preferred. To increase the durability and/or to establish and maintain the flexibility, the material of the deformable element may include additives. The deformable element is preferably flexible in all directions (axially, radially and in the circumferential direction). It is however also possible for the deformable element to exhibit partially directional flexibility. The deformable element may, for example, exhibit greater flexibility in the radial direction than in the circumferential direction and in the axial direction. A deformation of the deformable element in one direction typically also causes a deformation in other spatial directions. The deformable element expands, for example, in the axial direction and/or in the circumferential direction when compressed in the radial direction.

On the pump, there is preferably also provided at least one static seal that prevents an undesired backflow of the liquid from the outlet to the inlet.

The static seal prevents direct bypassing of the delivery path between the outlet and the inlet. Here, a bypass means that the liquid does not cover the entire length of the delivery path but follows a direct, shorter path from the outlet back to the inlet.

If the deformable element is a deformable diaphragm, the latter is preferably ring-shaped and laid into a gap between the eccentric and the housing. The delivery path forms a circular arc segment, and runs in sections (in the delivery direction from the inlet to the outlet) along the ring-shaped diaphragm. The static seal is arranged along the ring-shaped diaphragm outside the circular arc segment of the delivery path between the inlet and the outlet. By the static seal between the inlet and the outlet, a backflow is reliably prevented.

The static seal may be formed, for example, by an indented portion or a protrusion of the pump housing, such that a gap between the pump housing and the eccentric is reduced to such an extent that, regardless of the position of the eccentric, the diaphragm is always pinched in the region of the static seal, such that no bypass with respect to the delivery path is formed, and no backflow is possible. The static seal may also be formed by a thickening of the deformable diaphragm in sections (in the region of the static seal). By such a thickening of the diaphragm, it can likewise be ensured that a gap between the eccentric and the pump housing is always closed in the region of the static seal.

The static seal may in principle also be realized by the deformable diaphragm being fastened (for example screwed and/or adhesively bonded) in fluid-tight fashion to the pump housing in the region of the static seal. Such measures likewise effectively prevent a backflow between the deformable diaphragm and the pump housing.

If the deformable element is a hose, no special measures for forming a static seal are necessary, because in the case of a (fluid-tight) hose which is connected to the inlet and to the outlet, no bypassing can occur. The static seal is then implicitly jointly formed by the wall of the hose.

The eccentric is preferably of multi-part form. The eccentric preferably has an inner region which performs an eccentric rotational movement. Furthermore, an outer bearing ring may be provided that surrounds the inner region. It is preferable for at least one bearing to be situated between the inner region and the outer bearing ring. The bearing may be a ball bearing or a roller bearing. The inner region of the eccentric performs a rotational movement about the axis during operation. The eccentric arrangement, and if appropriate also the external shape of the eccentric, result(s) in an eccentric movement of a surface of the eccentric. The eccentric movement is transmitted to the outer bearing ring. By a bearing between the inner region and a bearing ring, an eccentric rotational movement of the inner region can be converted into an eccentric wobbling movement of the bearing ring without the rotational movement component also being transmitted. The fact that the movement of the bearing ring does not have a rotational movement component makes it possible for shear stresses in the deformable element and internal friction forces of the pump to be reduced. The deformable element is then flexed by the eccentric. It is preferable for only pressure forces and substantially no friction forces to act at a contact surface of the eccentric and of the deformable element. A corresponding division of the eccentric into an inner region and a bearing ring is also possible if the eccentric is an external rotor arranged around an (inner) housing. It is also possible for the outer bearing ring to be dispensed with and for the rollers of the bearing to roll directly on or against the deformable element.

The pump preferably has at least one drive for the movement of the eccentric. The drive is preferably an electric motor connected to the eccentric by a shaft (which runs along the axis). The pump is preferably also suitable for being operated in the opposite direction to the delivery direction. For this purpose, the eccentric is rotated counter to the delivery direction.

The adjustable axial calibration device makes it possible to influence, and in particular vary, the shape of the deformable element. A deformation of the deformable element in the axial direction by the axial calibration device also gives rise to a deformation in the radial direction. In particular, the deformable element is also braced radially as a result of an axial bracing action. Furthermore, with the adjustable axial calibration device, it is possible to targetedly influence, and in particular vary, the stiffness or deformability of the deformable element. In particular, it is possible by the axial calibration device to adapt the cross section of the delivery path between the inlet and the outlet. This effect can be utilized in order, by an adjustable axial calibration device, to compensate for dimensional inaccuracies and tolerances of the deformable element, of the eccentric and of the pump housing.

The pump is particularly advantageous if the deformable element bears, at both sides in the axial direction, against abutment surfaces, wherein a spacing of the abutment surfaces can be adjusted in targeted fashion by way of the axial calibration device.

By axial abutment surfaces that influence the position of the deformable element and the expandability of the deformable element, the desired calibration effect can be achieved particularly easily.

By the calibration device, it is made possible to particularly precisely set the amount of liquid that is delivered by a pump of this type during one rotation of the eccentric. For example, it is possible for a tolerance in the delivery rate as a function of the rotation of the eccentric to be improved to a deviation of less than 5% from a target delivery rate.

The pump is furthermore advantageous if the axial calibration device comprises a central calibration screw fitting by which the deformable element is braced in the axial direction.

The central calibration screw fitting is preferably designed to exert a force on a component, which is arranged on/in the pump housing, in order to displace the component. In one design variant, a stress anchor may be arranged on the pump housing, on which stress anchor the central calibration screw fitting engages. The stress anchor may be formed as a central spindle of the pump, which is equipped at least in sections with a thread, by which the calibration screw fitting is formed. The calibration screw fitting may comprise a screw and/or a nut. On the pump housing there may be provided an internal thread or an external thread for the purposes of screwing the pump housing to the calibration screw fitting. The calibration screw fitting is preferably of self-locking design, such that it cannot loosen during the operation of the pump. This may be achieved for example by virtue of the calibration screw fitting having a fine thread. Alternatively or in addition, a securing structure of the calibration screw fitting may be provided in order to prevent loosening of the calibration screw fitting. Such a securing structure may, for example, be a securing pin or a securing splint. It is also possible for the securing structure to be a (for example punctiform) welded connection that connects the calibration screw fitting to the pump housing.

The pump is furthermore advantageous if the axial calibration device comprises a multiplicity of screw fittings arranged in each case on a circle about the axis.

The screw fittings may, for example, be screwed by a common tool in order to calibrate the pump. A tool of this type may, for example, be referred to as a multi-head screwdriver, by which multiple screw fittings can be tightened simultaneously. The circle on which the screw fittings are arranged is preferably arranged concentrically around the axis of the pump.

The pump is furthermore advantageous if, between the outlet and the inlet, there is provided a static seal by which a backflow of liquid counter to the delivery direction is prevented.

A method for producing a calibrated pump for delivering a liquid is also proposed. The pump to be calibrated has a pump housing with at least one inlet and at least one outlet, wherein, on the pump housing, there is arranged an eccentric which is rotatable about an axis relative to the pump housing, and wherein a deformable element is arranged between the pump housing and the eccentric, which deformable element delimits at least one delivery path from the at least one inlet to the at least one outlet and forms at least one displaceable seal of the delivery path, which at least one displaceable seal separates off at least one closed pump volume in the delivery path, and furthermore, by way of a movement of the eccentric, the at least one displaceable seal can be displaced in a delivery direction from the inlet to the outlet for the purposes of delivering the liquid along the delivery path. Here, the method comprises at least the following steps:

a) providing the pump to be calibrated;

b) exerting an axial force on the deformable element in the axial direction;

c) affixing a calibration component of the pump such that the axial force is maintained.

The described method can be performed, inter alia, for the pump type described further above, by the calibration device provided on the pump. The method steps b) and c) are then performed by the adjustable axial calibration device. It is however also possible for the described method to be performed with pumps that do not have an adjustable axial calibration device. Then, the calibration is performed with the aid of a calibration device external to the pump, which calibration device is composed, for example, of a pump test stand and a tool for exerting the axial force and for fixing the calibration component. The calibration component is, for example, a cover by which the pump housing is closed off. The calibration in step b) may be performed on the basis of force control or travel control. Combinations of calibration on the basis of force control and calibration on the basis of travel control are also necessary. In the case of the calibration on the basis of force control, the force that acts on the deformable element is adjusted. In the case of calibration on the basis of travel control, the space available for the deformable element in the axial direction is adjusted. The space is delimited, for example, by the spacing of two abutment surfaces against which the deformable element bears at both sides in the axial direction.

Step a) comprises in particular assembly of the components of the pump, such that the basic functionality of the pump is established. In step b), the assembled pump is then physically adjusted with regard to its operating behavior, in particular with regard to the (reproducible) accuracy of the delivery rate per delivery cycle. Depending on the operating behavior under consideration, it is accordingly the case in step b) that an axial force on the deformable element is increased (and if appropriate also decreased again) until the desired target value of the operating behavior is attained. When the target value has been attained and the calibration process is complete, the state is permanently maintained by virtue of the calibration component, which serves for generating the axial force being fixed in its position (step c)).

The described method is particularly advantageous if, in step c), the pump housing is connected to the calibration component by a welded connection.

A particularly permanent and rigid connection between the pump housing and the calibration component can be achieved by a welded connection. Alternatively or in addition, it is also possible for the calibration component to be clamped and/or screwed onto the pump housing.

The method is furthermore advantageous if the pump is heated at least during one of the two steps b) and c).

During the calibration, the deformable element adapts to the adjacent components and/or to the mode of operation of the pump. The adaptation of the deformable element may be accelerated if the deformable element is heated. Then, a plastic deformation of the deformable element can occur, which permits a permanent adaptation of the deformable element to the other components of the pump (in particular to the eccentric and to the pump housing). In the context of the heating, it is, for example, possible for the pump to be exposed to a temperature of greater than 60° C., and in particular of between 70° C. and 110° C., during steps b) and c). The suitable temperature for the heating during the course of the calibration is in particular dependent on the material of which the pump housing, the eccentric and the deformable element are composed. It is preferably the case that, during steps b) and c), the temperature lies above a transition temperature at which the material properties of the deformable element undergo a significant change.

The method is furthermore advantageous if a positive pressure is generated in the delivery path at least during one of the two steps b) and c).

By a positive pressure in the delivery path, the deformable element adapts to the conditions that also prevail within the pump during the normal operation of the pump. For example, a pressure of at least 2 bar, but preferably of at least 6 bar, may be set in the delivery path. It is preferable for the pressure to not be increased significantly beyond 15 bar, because otherwise, the axial forces for the adjustment of the pump during the calibration may become too high.

The method is furthermore advantageous if step b) is performed for a minimum time period of at least 5 seconds, preferably at least 30 seconds, before the affixing in step c) is performed.

A certain amount of time may be required for the adaptation of the deformable element, because the deformation processes (for example creep processes) that occur in the deformable element do not take place immediately. By virtue of step b) being performed over a minimum time period, it can be ensured that the deformation processes within the pump, and in particular the deformation processes of the deformable element, are completed before the fixing is performed. The deformable element has then assumed a final position. It is however preferable for the minimum time period not to exceed 10 minutes or even only 5 minutes, because only very minor changes occur after that, and furthermore, the production process of the pump would be unduly lengthened.

It is particularly preferable if, during the two steps b) and c), a combination of heating of the pump, a positive pressure in the delivery path and a minimum time period of at least 5 seconds for the calibration is used in order to achieve particularly precise calibration of the pump.

The method is furthermore advantageous if, during step b), the eccentric is moved and the pump delivers liquid, wherein the delivery rate of the pump is monitored, and the calibration is adapted if the delivery rate of the pump does not correspond to a predefined delivery rate.

During the adaptation of the calibration, a force that acts on the deformable element in the axial direction, and/or the spacing between two abutment surfaces against which the deformable element bears at both sides in the axial direction, can be adapted. If the delivery rate is lower than the predefined delivery rate, then the axial force is preferably decreased, and/or the spacing of the abutment surfaces is increased. If the delivery rate is higher than the predefined delivery rate, then the axial force is preferably increased, and/or the spacing of the abutment surfaces is decreased.

Monitoring of the calibration during a delivery process may also be combined with one of the measures (heating, positive pressure and/or minimum time period) described further above in order to achieve particularly precise calibration of the pump. In particular, it is also possible for the delivery process of the pump to be performed in the presence of a particular pressure difference between the inlet and the outlet. The pressure difference preferably corresponds to the normal operating conditions of the pump.

The special advantages and design features specified for the described method can be applied and transferred analogously to the described pump. The same applies to the particular advantages and embodiment features specified with regard to the described pump, which can be transferred analogously to the described method. The described method can be performed in particular with all described pumps having an adjustable axial calibration device. Furthermore, the described method can likewise be performed for pumps without an adjustable axial calibration device by a corresponding calibration tool or a corresponding calibration setup. By contrast, by the described pump types with an adjustable axial calibration device, it is possible for the calibration of the pump to be performed even during an operating phase of the pump (after the completion of the production of the pump). In particular, by the adjustable axial calibration device, it is preferably also possible for a (retroactive) adaptation of the delivery rate of the pump to be performed, for example if the delivery rate has changed as a result of wear phenomena of the pump.

By the calibration of the pump, it is in particular possible to compensate for production tolerances of the pump that arise in particular as a result of inaccuracies (in position, in shape, etc.) of the eccentric and of the pump housing. Here, it is nevertheless possible for the delivery rate of the pump to still be adapted very precisely to a desired (target) delivery rate. The manufacturing tolerances and inaccuracies of the eccentric and pump housing are, during the calibration, compensated for by more or less intense squeezing or pre-deformation of the deformable element. The more or less intense pre-deformation or squeezing of the deformable element leads to a different level of energy absorption of the pump during the rotation of the eccentric.

Also proposed is a motor vehicle, comprising an internal combustion engine, an exhaust-gas treatment device for purification of the exhaust gases of the internal combustion engine, and a device for the metering of a liquid (in particular urea-water solution) for exhaust-gas purification into the exhaust-gas purification device, having a described pump or having a pump produced in accordance with the described method.

BRIEF DESCRIPTION OF THE DRAWINGS

The invention and the technical field will be explained in more detail below on the basis of the figures. In particular, it should be noted that the figures and in particular the proportions illustrated in the figures are merely schematic. In the drawings.

DETAILED DESCRIPTION OF THE PRESENTLY PREFERRED EMBODIMENTS

Figure 1:
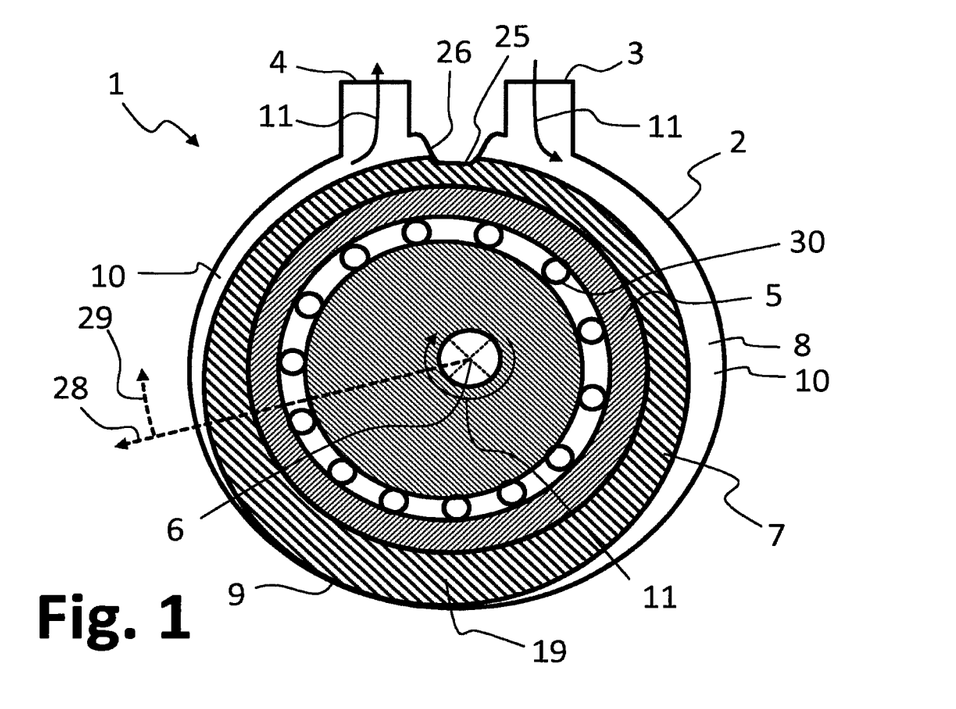
FIG. 1 shows a first design variant of a described pump.
Figure 3:
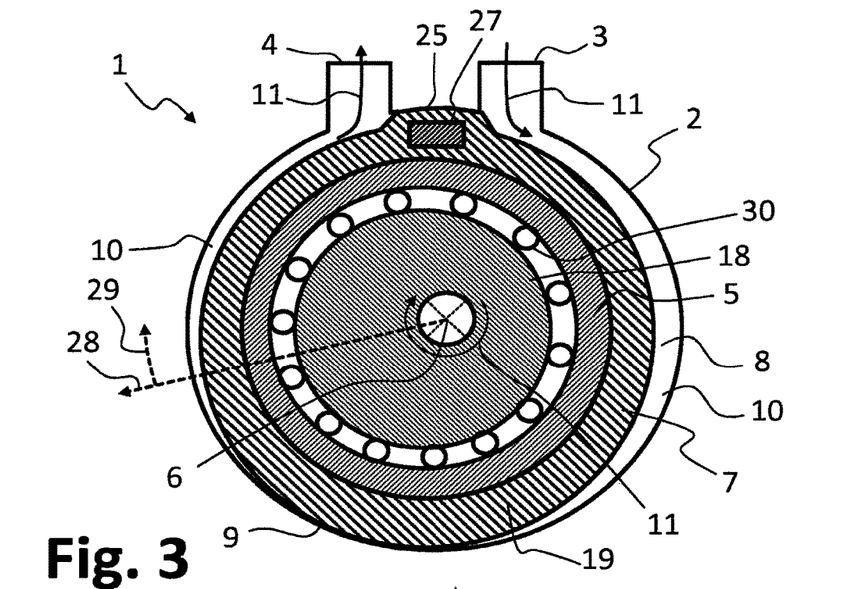
FIG. 3 shows a second design variant of a described pump.

FIG. 1 and FIG. 3 show two different design variants of a described pump 1, which each have a deformable diaphragm 19 as a deformable element 7. For the description of the pump, FIGS. 1 and 3 each depict a coordinate system with the axis 6, the radial direction 28 and the circumferential direction 29.

The deformable element 7 is arranged, in the pump housing 2, between the pump housing 2 and the eccentric 5. The pump housing 2 has an inlet 3 through which liquid can flow into the pump housing 2 in a delivery direction 11, and an outlet 4 through which liquid can flow out of the pump housing 2 in a delivery direction 11. The eccentric 5 is arranged in the pump housing 2 so as to be rotatable about an axis 6. When the eccentric 5 rotates, the rotation of the eccentric 5 is converted by way of a bearing 30 into a rolling movement of the deformable element 7 on the pump housing 2. In this way, the deformable element 7 bears against the pump housing 2 in regions, and forms a seal 9. Between the pump housing 2 and the deformable element 7, there is situated a delivery path 8 from the inlet 3 to the outlet 4. This delivery path 8 is divided into at least one pump volume 10 by the at least one seal 9.

Situated between the inlet 3 and the outlet 4, in an arrangement opposite to the delivery direction 11, there is a static seal 25, which prevents a backflow of liquid from the inlet 3 to the outlet 4. In the design variant of a pump 1 as per FIG. 1, the seal 25 is formed by an indented portion 26 of the pump housing 2, which indented portion presses the deformable element 7 against the pump housing 2 such that no backflow from the inlet 3 to the outlet 4 is possible. In the design variant as per FIG. 3, the seal 25 is realized by a local thickening of the deformable element 7 in the region of the static seal 25. This local thickening is realized by a pin 27, which is inserted into the deformable element 7.

Figure 2:
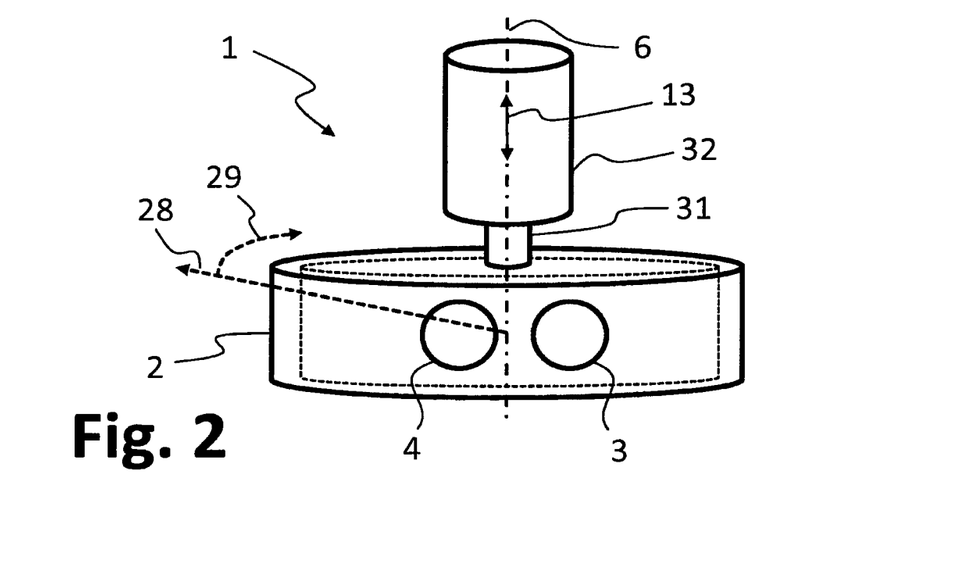
FIG. 2 shows an isometric view of a described pump.

For better understanding of the pump 1, FIG. 2 shows an isometric view of the pump 1. The Figure shows the axis 6, the radial direction 28 and the circumferential direction 29, and the axial direction 13, which runs parallel to the axis 6. The Figure shows the pump housing 2 with the inlet 3 and the outlet 4. Arranged above the pump housing 2 along the axis 6 is a drive 32, which moves the eccentric (not illustrated) in the pump housing 2 by a shaft 31.

Figure 7:
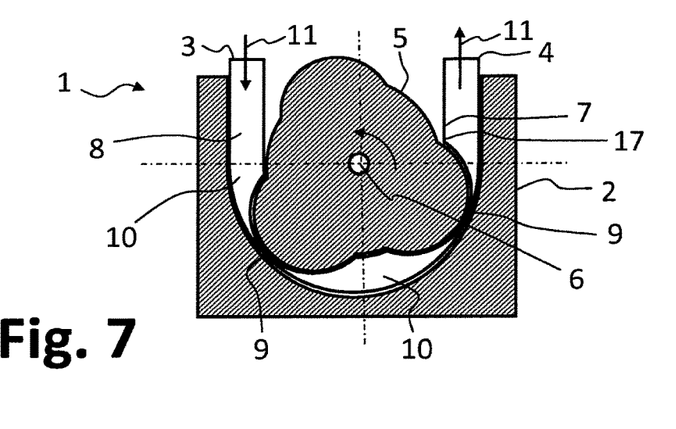
FIG. 7 shows a third design variant of a described pump.

FIG. 7 shows a particular design variant of a pump 1 in which a hose 17 is used as deformable element 7. The hose 17 is laid in the pump housing 2 and simultaneously forms the inlet 3 and the outlet 4, wherein liquid can flow into the hose 17 through the inlet 3, and can flow out of the hose 17 through the outlet 4, in a delivery direction 11. Also arranged in the housing 2 is an eccentric 5, which is mounted so as to be rotatable about the axis 6. The eccentric 5 compresses the hose 17 against the housing 2 in sections, such that seals 9 are formed at which a delivery path 8 formed by the hose 17 is closed, such that at least one closed pump volume 10 is formed along the hose 17 or the delivery path 8.

FIGS. 4, 5, 6 and 8 show cross sections through four different design variants of the pump 1. The technical features shown in FIGS. 4, 5, 6 and 8 can be transferred, individually or in any desired combination with one another, to the various design variants of the pump illustrated in FIGS. 1, 3 and 7. The cross sections illustrated in FIGS. 4, 5, 6 and 8 in each case do not correspond to exactly one of the design variants of the pump illustrated in FIGS. 1, 3 and 7, but rather may, where technically possible, be used for all of the design variants of the pump 1 illustrated in FIGS. 1, 3 and 7.

Here, FIGS. 4, 5, 6 and 8 will firstly be discussed jointly, before differences between the illustrated variants are discussed thereafter. It is possible in each case to see the pump 1 with the pump housing 2, the eccentric 5, the axis 6 about which the eccentric 5 is movable, and the deformable element 7. In the design variants illustrated in FIGS. 4, 5 and 6, the deformable element is in each case a deformable diaphragm. The delivery path 8 and the pump volume 10 are delimited by the deformable element 7 and by the pump housing 2. In the design variant as per FIG. 8, the deformable element 7 is a hose 17 that delimits the delivery path 8 and the pump volume 10. It is also possible in each case to see the bearing 30 by which a rotational movement about the axis 6 can be converted into an eccentric wobbling movement.

Figure 4:
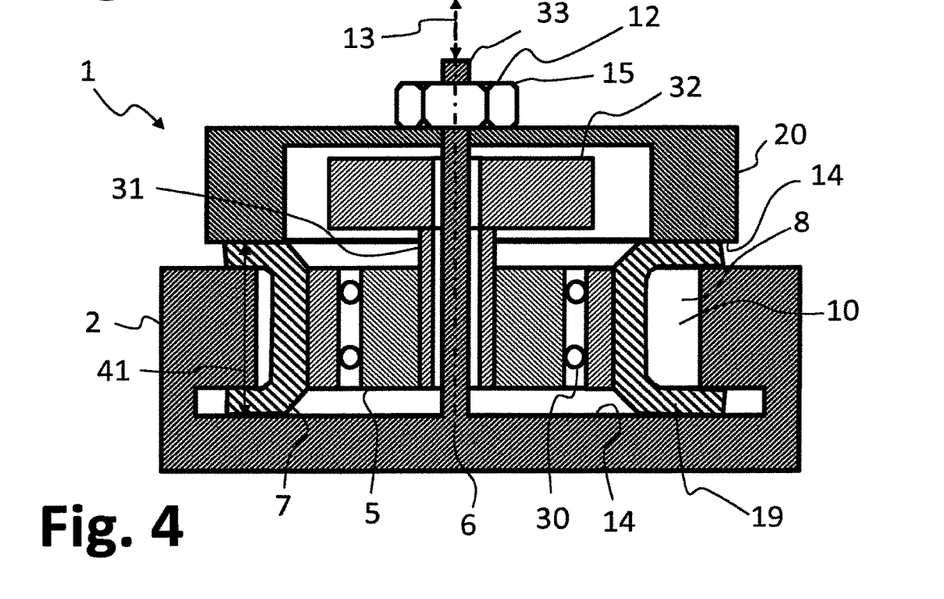
FIG. 4 shows a cross section through a described pump.

In all of the design variants as per FIGS. 4, 5, 6 and 8, the calibration is performed in each case in the axial direction 13, parallel to the axis 6. In the design variants illustrated in FIGS. 4, 5, 6 and 8, there are in each case two abutment surfaces 14 against which the deformable element 7 bears and the spacing 41 of which can be adjusted. In the design variants as per FIGS. 4 and 8, this is performed with the aid of an adjustable calibration structure 12. In FIG. 4, the adjustable calibration structure 12 is a central calibration screw fitting 15. The central calibration screw fitting 15 braces a calibration component 20, which can be referred to as a cover of the pump 1, against the pump housing 2, wherein the bracing is realized by way of a stress anchor 33 which connects the adjustable calibration structure 12 (the central calibration screw fitting 15) and the calibration component 20 to the housing 2. A stress anchor 33 of this type is however merely one possibility for a central calibration screw fitting 15. It would also be possible for a thread to be arranged in each case on the pump housing 2 and/or on the calibration component 20, and for the threads to be screwed directly together for the purposes of calibrating the pump 1 or axially bracing the deformable element 7.

Figure 5:
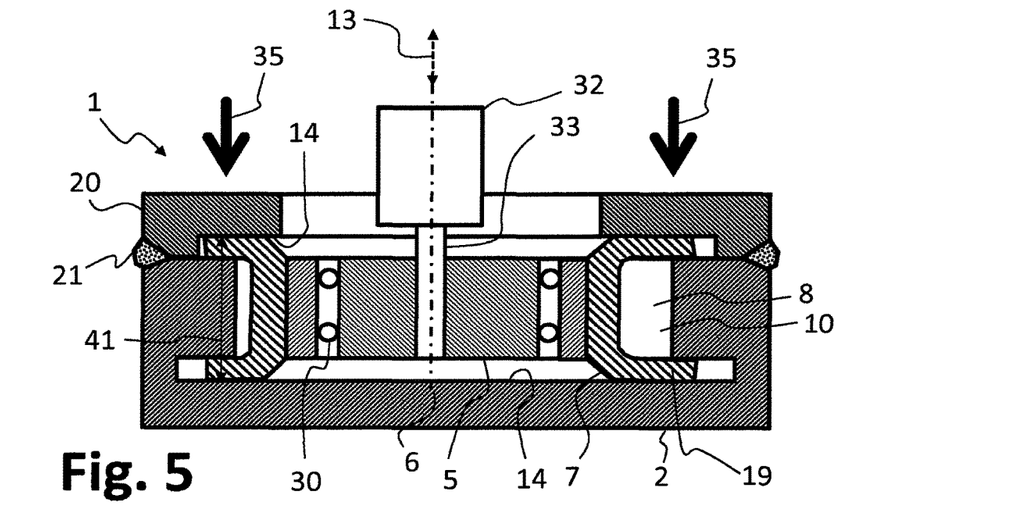
FIG. 5 shows a cross section through a further described pump.
Figure 6:
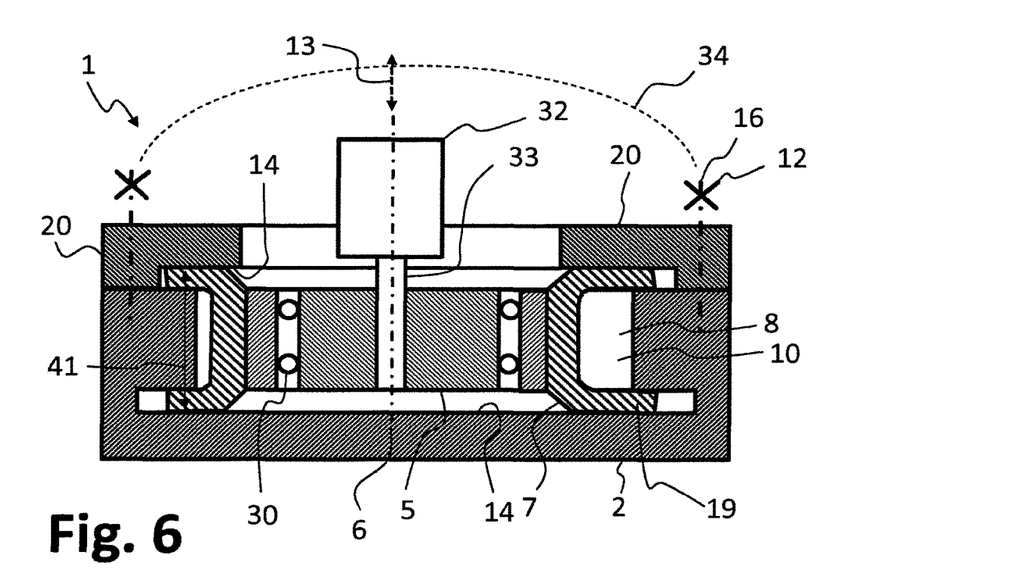
FIG. 6 shows a cross section through a yet further described pump.
Figure 8:
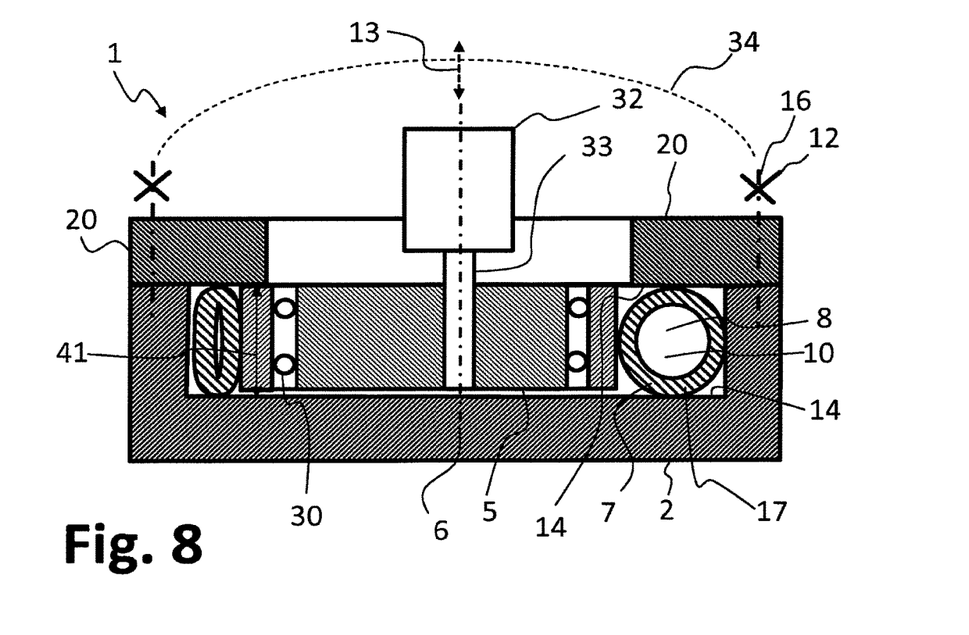
FIG. 8 shows a cross section through a yet further described pump.

In the design variants as per FIGS. 5 and 8, the axial calibration device is realized by way of screw fittings 16, which are arranged on a circle 34 around the axis 6 of the pump 1. By the screw fittings 16, a calibration component 20 can be screwed to the pump housing 2. By an adaptation of the torque with which the screw fittings 16 are tightened, a position of the abutment surfaces 14 relative to one another, and thus a spacing 41 of the abutment surfaces 14, is likewise influenced, such that the deformable element 7 is adapted or deformed in the axial direction 13. In the design variant in FIG. 5, no axial calibration device is provided on the pump 1 itself. Here, the calibration can rather be performed, during the assembly of the pump 1, by virtue of an axial force 35 being exerted on a calibration component 20 of the pump 1. When the pump has been calibrated, the calibration component 20 can be fixedly connected to the pump housing 2 to fix the position of the calibration component 20 relative to the pump housing 2, such that the spacing 41 of the two abutment surfaces 14 relative to one another is defined. The permanent fixing of the calibration component 20 relative to the pump housing 2 can be realized for example by a welded connection 21.

Figure 9:
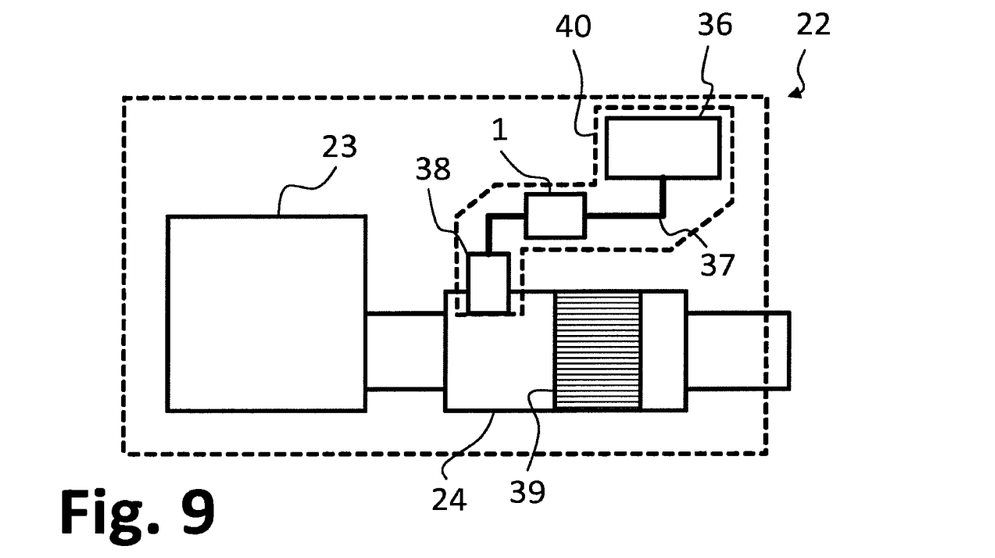
FIG. 9 shows a motor vehicle having a described pump.

FIG. 9 shows a motor vehicle 22 having an internal combustion engine 23 and having an exhaust-gas treatment device 24 for the purification of the exhaust gases of the internal combustion engine 23. In the exhaust-gas treatment device 24 there is provided an SCR catalytic converter 39 by which the method of selective catalytic reduction for exhaust-gas purification can be carried out. For this purpose, a liquid additive (aqueous urea solution) for exhaust-gas purification can be supplied to the exhaust-gas treatment device 24 by a device 40. The device 40 has a tank 36 for storing the liquid additive, a line 37 for conducting the liquid additive, and a metering device 38 for metering the liquid additive to the exhaust-gas treatment device 24. On the line 37, there is provided a pump 1 by which delivery of the liquid additive can be performed. The pump 1 is preferably precisely calibrated such that the pump particularly precisely outputs a predefined delivery rate. For this reason, a device 40 having a described pump 1 is particularly preferably used in combination with a metering device 38, which has merely a passively opening valve and/or a nozzle for the atomization of the liquid additive in the exhaust-gas treatment device 24, and which operates without an actively opening and closing dosing valve. The dosing may rather be realized with the aid of the described pump or with the aid of the pump 1 produced in accordance with the described method.

By way of precaution, it should also be noted that the combinations of technical features shown in the figures are not generally binding. For example, technical features from one figure may be combined with other technical features from a further figure and/or from the general description. The only exception to this is if the combination of features has been explicitly referred to here and/or a person skilled in the art identifies that the basic functions of the device can no longer be realized otherwise.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SIGNS

1 Pump
2 Pump housing
3 Inlet
4 Outlet
5 Eccentric
6 Axis
7 Deformable element
8 Delivery path
9 Displaceable seal
10 Pump volume
11 Delivery direction
12 Axial calibration device
13 Axial direction
14 Abutment surface
15 Central calibration screw fitting
16 Screw fitting
17 Hose
18 Arcuate gap
19 Deformable diaphragm
20 Calibration component
21 Welded connection
22 Motor vehicle
23 Internal combustion engine
24 Exhaust-gas treatment device
25 Static seal
26 Indented portion
27 Pin
28 Radial direction
29 Circumferential direction
30 Bearing
31 Shaft
32 Drive
33 Stress anchor
34 Circle
35 Axial force
36 Tank
37 Line
38 Metering device
39 SCR catalytic converter
40 Device
41 Spacing

The invention claimed is:

1. A pump (1) that delivers a liquid, the pump (1) comprising:
a pump rotation shaft (31) arranged along a pump axis (6);
a pump housing (2) with at least one inlet (3) and at least one outlet (4), the pump housing including a stress anchor (33) projecting through the pump rotation shaft (31) along the pump axis (6);
an eccentric (5) arranged on the pump housing (2), the eccentric (5) being rotatable, by the pump rotation shaft (31), about the pump axis (6) relative to the pump housing (2);
a deformable element (7) arranged between the pump housing (2) and the eccentric (5), the deformable element (7) delimiting at least one delivery path (8) from the at least one inlet (3) to the at least one outlet (4) and forming at least one displaceable seal (9) of the delivery path (8), which at least one displaceable seal separates off at least one closed pump volume (10) in the delivery path (8);
a calibration component (20) arranged so as to contact the deformable element (7) at abutment surfaces (14) of the calibration component (20);
and
at least one adjustable axial calibration device (12) including a central calibration screw fitting (15) threadingly connectable to an end region of the stress anchor (33), the threading adjustment of the screw fitting (15) with respect to the stress anchor (33) applying an axial force (35) to the calibration component (20) by which the axial force (35) is applied, from the abutment surfaces (14) to the deformable element (7) so as to brace the deformable element (7) in an axial direction (13) parallel to the pump axis (6), the application of the axial force (35) to the calibration component (20) affixing the calibration component (20) to the pump such that the axial force (35) is permanently maintained, wherein, by a movement of the eccentric (5), the at least one displaceable seal (9) is displaceable in a delivery direction (11) from the inlet (3) to the outlet (4) to deliver the liquid along the delivery path (8).

2. The pump (1) as claimed in claim 1, wherein the deformable element (7) comprises a deformable diaphragm (19), and the delivery path (8) between the at least one inlet (3) and the at least one outlet (4) is delimited by the pump housing (2) and by the deformable diaphragm (19).

3. The pump (1) as claimed in claim 1, the abutment surfaces (14) having a spacing (41), wherein the deformable element (7) bears, at both sides in the axial direction (13), against the abutment surfaces (14), wherein the spacing (41) of the abutment surfaces (14) is adjustable by the axial calibration device (12).

4. The pump (1) as claimed in claim 1, further comprising, between the outlet (4) and the inlet (3), a static seal (25) by which a backflow of liquid counter to the delivery direction (11) is prevented.

5. A motor vehicle (22) comprising an internal combustion engine (23), an exhaust-gas treatment device (24) for the purification of the exhaust gases of the internal combustion engine (23), and a device (40) for metering a liquid for exhaust-gas purification into the exhaust-gas treatment device (24), having a pump (1) as claimed in claim 1.

6. A method for producing a calibrated pump for delivering a liquid, the method comprising:
 a) providing a pump (1) having a pump rotation shaft (31) arranged along a pump axis (6); a pump housing (2) with at least one inlet (3) and at least one outlet (4), the pump housing (2) including a stress anchor (33) projecting through the pump rotation shaft (31) along the pump axis (6); an eccentric (5) arranged on the pump housing (2), the eccentric (5) being rotatable, by the pump rotation shaft (31), about the pump axis (6) relative to the pump housing (2); a deformable element (7) arranged between the pump housing (2) and the eccentric (5), the deformable element (7) delimiting at least one delivery path (8) from the at least one inlet (3) to the at least one outlet (4) and forming at least one displaceable seal (9) of the delivery path (8), which at least one displaceable seal separates off at least one closed pump volume (10) in the delivery path (8); a calibration component (20) arranged so as to contact the deformable element (7) at abutment surfaces (14) of the calibration component (20); and at least one adjustable axial calibration device (12) including a central calibration screw fitting (15) threadingly connectable to an end region of the stress anchor (33) by which the deformable element (7) is braced in an axial direction (13) parallel to the pump axis (6), wherein, by a movement of the eccentric (5), the at least one displaceable seal (9) is displaceable in a delivery direction (11) from the inlet (3) to the outlet (4) to deliver the liquid along the delivery path (8); and
 b) exerting, by operation of the at least one adjustable axial calibration device (12) on the calibration component (20) by threading adjustment of the screw fitting (15) with respect to the stress anchor (33), an axial force (35) from the abutment surfaces (14) to the deformable element (7) in the axial direction (13), the operation of the at least one adjustable axial calibration device (12) affixing the calibration component (20) to the pump such that the axial force (35) is permanently maintained.

7. The method as claimed in claim 6, further comprising: connecting the pump housing (2) to the calibration component (20) by a welded connection (21).

8. The method as claimed in claim 6, further comprising heating the pump (1) during step b).

9. The method as claimed in claim 6, further comprising generating a positive pressure in a portion of the delivery path (8) during step b).

10. The method as claimed in claim 6, wherein, during step b), the eccentric (5) is moved and the pump (1) delivers liquid, wherein the delivery rate of the pump (1) is monitored, and the axial force (35) is adapted if the delivery rate of the pump (1) does not correspond to a predefined delivery rate.

11. A motor vehicle (22) comprising an internal combustion engine (23), an exhaust-gas treatment device (24) for the purification of the exhaust gases of the internal combustion engine (23), and a device (40) for metering a liquid for exhaust-gas purification into the exhaust-gas treatment device (24), having a calibrated pump produced by the method of claim 6.

* * * * *